United States Patent [19]

Finley

[11] Patent Number: 5,425,924
[45] Date of Patent: Jun. 20, 1995

[54] COMPACT FIXED-BED REACTOR WITH FOLDED REACTION PATH

[76] Inventor: Charles M. Finley, 300 W. Lemon Ave., Arcadia, Calif. 91007

[21] Appl. No.: 117,468

[22] Filed: Sep. 7, 1993

[51] Int. Cl.⁶ .................... B01J 8/02; B01J 19/30; B01J 35/02
[52] U.S. Cl. .................... 422/220; 55/308; 55/444; 55/445; 96/152; 422/176; 422/177; 422/228; 422/238; 422/239; 422/311
[58] Field of Search ........ 422/168, 176, 177, 188–191, 422/193, 195, 211, 220, 224, 225, 228, 236, 238, 239, 311; 60/299–302; 55/444, 308, 442, 445; 56/107, 152; 96/129, 154

[56] References Cited

U.S. PATENT DOCUMENTS

| 313,028 | 2/1885 | Sprinkel | 55/445 X |
| 1,316,330 | 9/1919 | Modlin | 55/445 |
| 1,519,607 | 12/1924 | Fauzon | 422/239 |
| 1,891,170 | 6/1931 | Nose | 55/445 X |
| 2,120,538 | 6/1938 | Andrews | 549/248 |
| 2,127,561 | 8/1938 | Herrmann | 422/160 |
| 2,690,267 | 9/1954 | Miller et al. | 422/211 X |
| 3,048,468 | 8/1962 | Watkins | 422/191 X |
| 3,228,746 | 1/1966 | Howk et al. | 60/301 |
| 3,250,263 | 5/1966 | Gerjets | 55/442 X |
| 3,898,049 | 8/1975 | Burroughs et al. | 422/190 |
| 4,318,894 | 3/1982 | Hensel et al. | 422/176 X |
| 4,590,044 | 5/1986 | Mos et al. | 422/191 |
| 4,843,815 | 7/1989 | Smojver | 60/299 |

Primary Examiner—Robert J. Warden
Assistant Examiner—L. M. Crawford
Attorney, Agent, or Firm—W. Wayne Lianh

[57] ABSTRACT

A compact fixed-bed catalytic reactor containing a plurality of staggered partitioning plates inside a reactor vessel to form a folded reaction path. The reactor is substantially rectangular in shape and each of the partitioning plates is held inside the reactor by a frictional force between the partitioning plate and the inner wall of the reactor vessel while one side thereof, being shorter than the width of a corrsponding inner side the reactor, forms an opening allowing the passage of reactant therethrough. The partitioning plates contain a plurality of fingers to further secure the same in place and prevent horizontal movement thereof. The present invention allows a box-like catalytic reactor to provide the advantages of a fixed-bed tubular reactor, while maintaining a desirable spacial compactness and lowering the construction cost.

15 Claims, 5 Drawing Sheets

GAS IN

Fig- 3B

GAS IN

COMPACT FIXED-BED REACTOR WITH FOLDED REACTION PATH

FIELD OF THE INVENTION

This invention relates to a box-like catalytic reactor that provides the characteristics and advantages of a fixed-bed tubular reactor, or in the alternative, a fixed-bed tubular reactor that has the compactness of a box-like reactor. More particularly, this invention relates to a fixed-bed catalytic reactor having a folded reaction path so as to provide an elongated and well-defined flow path through which the reactant molecules must travel. The folded reaction path of the present invention allows the reactants to travel through the reactor with an increased linear speed at the same space velocity while, at the same time, it maintains a generally uniform path length for each reactant molecule, maximizes reaction conversion, minimizes the occurrence of side-reactions, and prolongs the life of catalyst.

BACKGROUND OF THE INVENTION

Catalytic reactions involving gaseous reactants are often conducted in fixed-bed chemical reactors filled with an appropriate catalyst. Because of the high mobility of gas, the fixed-bed reactors designed for gaseous reactants typically consist of a multiplicity of long, small bore tubes, each in the form of a packed tubular reactor, in order to provide the resident time required to achieve a desired reaction yield and minimize the extent of undesired channelling. An ideal tubular reactor is designed such that it approximates a plug flow type reactor with minimum amount of mixing, and each reactant molecule travels approximately the same length in the reactor.

A typical tubular reactor for gaseous reactants can be only several inches in diameter, but many feet long. Because of the great dimensional asymmetry of tubular reactors and the relative high cost of construction thereof, it is desirable to modify a tank- or vessel-type chemical reactor so that it provides many of the desired characteristics and advantages of a tubular reactor while maintaining the dimensional compactness and allowing a lower construction cost. Vessel- or tank-*type reactors are known to cause channelling, back-mixing, non-uniform resident time, etc., among a number of other problems such as low linear velocity.

U.S. Pat. No. 2,690,267 issued to Miller et al. discloses a catalyst loading and baffle by which a plurality of baffle plates in the shape of truncated circles are inserted into corresponding grooves inside the reactor to reduce the extent of channelling. The baffled reactor disclosed in the '267 patent does not provide a uniform path length for the reactant molecules. Because of the circular cross-section of the reactor, some reactants travelling near the center of the reactor (horizontally) will have a shorter path length than those travelling near the edge of the reactor, thus resulting in non-uniform resident times for the reactants and possibly low reaction yield and/or side products.

U.S. Pat. No. 3,898,049 issued to Burroughs, et al. discloses a hydrogenation reactor comprising an elongated vertical container and a plurality of vertical baffles dividing the container into a plurality of vertical compartments thus increasing the height-to-width ratio of the reactor and allowing the linear velocity of the flowing reactants to be increased to several times that of a single pass reactor. One of the disadvantages of the compartmentized reactor disclosed in the '049 patent is that, in half of the compartments, the gaseous reactants must travel downward. Furthermore, because all the radially disposed compartments adjoin the same core compartment, leakage may become a concern. Also, the compartments do not have the same cross-sectional areas, thus resulting in non-uniform flow paths for the gas reactants U.S. Pat. No. 2,127,561 issued to Herman discloses a heat exchange catalytic converter which contains a plurality of paired catalyst passages. The entering gases are led into the reactor which pass upwardly through one set of passages then downwardly through another set of passages. Because of the heat liberated by the exothermic reaction, the catalyst at an inlet zone will be heated by the contiguous catalyst at an exit zone. U.S. Pat. No. 1,945,353 issued to Jaeger discloses a similar multiple-path reactor to effect heat exchange between catalysts in different paths.

U.S. Pat. No. 2,120,538 issued to Andrews discloses a vapor phase oxidation reactor which contains a plurality of staggered shelves, on which is placed a vanadium oxide catalyst. The vapors pass downwardly over the catalyst. U.S. Pat. No. 3,048,468 issued to Watkins discloses a similar catalytic reactor containing a plurality of staggered shelves, on which the catalyst is placed. Inert particles are heated and introduced into the reactor which travel counter-currently to the reactants to effect heat transfer. U.S. Pat. No. 3,506,408 issued to Kageyama, et al., also discloses a reactor containing similarly staggered catalyst shelves.

U.S. Pat. No. 4,590,044 issued to Mos, et al., discloses a multistage reactor containing a number of radially disposed ring-shaped lamellae of two different sizes. The smaller lamellae contact the central inlet tube but do not contact the inner shell of the reactor and the larger lamella contact the inner,shell but do not contact the inlet tube. The smaller lamella alternate with the larger lamella so that a zig-zag path is formed in the reaction space.

SUMMARY OF THE INVENTION

The primary object of the invention is to develop a fixed-bed, or packed, catalytic reactor with folded reaction path Which provides the advantages and characteristic of a linear, tubular reactor, while maintaining a substantially more compact reactor dimension and allowing simplicity of construction.

In a preferred embodiment of the present invention, the reactor comprises a substantially rectangular reactor vessel and a plurality of spaced apart, substantially identical partitioning plates fixedly attached to the inner wall of the reactor in a staggered manner so as to form a folded reaction path inside the reactor. Each of the partitioning plates has a dimension by which one side thereof is substantially equal to but only slightly less than the corresponding inner side of the reactor, whereas the other side of the partitioning plate is shorter than the corresponding inner side of the reactor vessel. The partitioning plates are placed inside the reactor vessel in such a manner that three sides thereof tightly adjoin the inner wall of the reactor vessel, while a gap is formed between the forth side of the partitioning plate and the inner wall of the reactor vessel to thereby create an opening allowing the reactant gas to travel therethrough. The partitioning plates are designed with such a dimension so that they can be secured inside the reactor vessel by the frictional force. However, other means can be provided to further, or in lieu thereof, secure the partitioning plates to the reactor wall.

Optionally, a finger or a plurality of fingers can be provided as extension of the partitioning plates so that the aggregate length of the shorter side and the finger matches that of the inner dimension of the reactor to allow for a firm grip of the plates inside the reactor. In an alternate embodiment, the fingers can be made to be slightly longer than the width of corresponding inner side of the reactor. The fingers can be bent to allow the partitioning plates to be firmly secured inside the reactor. The existence of these fingers also prevents the horizontal movement of the partitioning plates, thus ensuring a consistent folded reaction path for the reactants. Furthermore, a plurality of grooves may be provided on the inner wall of the reactor vessel to allow the partitioning plates to be snapped thereto as an additional, or alternate, securing means.

One of the main advantages of the present invention is that it provides an elongated and relatively uncommingled flow path for the reactant molecules, similar to that provided by a tubular reactor. The paths travelled by the reactant molecules are essentially parallel to each other, as well as parallel to the partitioning plates and the rectangular walls of the reactor vessel that define each catalyst region. The reactor of the present invention differs from a baffled reactor in that, among other things, it provides a well-defined flow path. In many baffled reactors, the flow path could vary depending on the reactant flow rate and/or the pressure drop across the catalyst bed. Furthermore, in baffled reactors, the paths travelled by reactant molecules often cross each other. More particularly, the flow paths in the baffled reactor do not resemble the parallel pattern provided by the present invention, thus often causing mixing between reactants and products resulting in undesired side products.

Since the reactor of the present invention is functionally similar to a tubular reactor, it has many of the characteristics of a tubular reactor. With the present invention, high gas linear velocities can be maintained without compromising the resident time of the reactants. In a strongly exothermic reaction, this aids in "spreading out" the large amounts of heat which are generated by the reaction. Failure to limit the extent of such heating can result in localized temperatures high enough to damage the catalyst and to produce excessive amounts of by-products as well. Also, the increased linear velocity and the reduced cross-section area, as well as the increase length, of the flow path allows a higher backpressure at the inlet and inside the catalyst bed to be maintained. This is advantageous as it forces the gas reactants to spread out more within the catalyst bed, resulting in improved utilization of the catalyst bed and less chance that stagnant areas may exist.

It is preferred that the partitioning plates be made of metal so as to facilitate the conduction of heat back to the wall of the reactor vessel, and thereby to help make the internal temperature of the reactor more uniform. This, in itself, improves reaction yield because more of the catalyst/gas interfaces can be held at or near the optimum temperature for best yield. Hot spots and the resultant coking and/or other damages to the catalyst are also minimized with the present invention due to significantly improved thermal transfer within the bed.

The reactor of the present invention provides many of the advantages of a tubular reactor but with a more compact physical dimension. More particularly, it does not have the situation wherein one dimension (length) is unproportionately greater than others. For example, with a ten-fold path, a reactor of the present invention having a width of 12 inches is equivalent to a tubular reactor having 10 feet in length. Although a tubular reactor may be bent to reduce its physical dimension, doing so, however, will cause problems in repacking the reactor, and is generally not desirable.

Another advantage of the present invention over a conventional tubular reactor is that, if desired, the cross-section of the bed can be varied, and the gas linear velocity can be changed accordingly, by having larger spacings between the partitioning plates in one part of the bed than those in another part. This feature might be used to spread out the initial exotherm by having a very high velocity in the first section, than widening the spacings between the partitioning plates for subsequent parts of the bed where the reaction rate is lower and, therefore, a longer contact time between the reactants and the catalyst is desired. This would allow maximum conversion of the remaining reactants while keeping the initial exotherm within design limits. It would be considerably more difficult, if possible, to attempt to create the same variation in the cross-sections of a tubular reactor.

BRIEF DESCRIPTION OF THE DRAWINGS

The objects and advantages of the present will become more apparent upon reading the following detailed description and upon reference to the drawings in which.

DETAILED DESCRIPTION OF THE PREFERRED EMBODIMENT

Figure 1A:
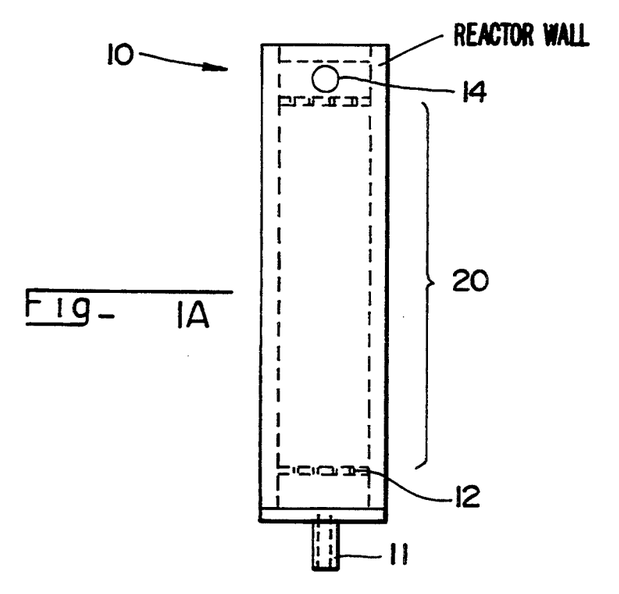
FIGS. 1A and 1B are a side view and a front view, respectively, of a rectangular tank-type fixed-bed reactor without the partitioning plates.
Figure 1B:
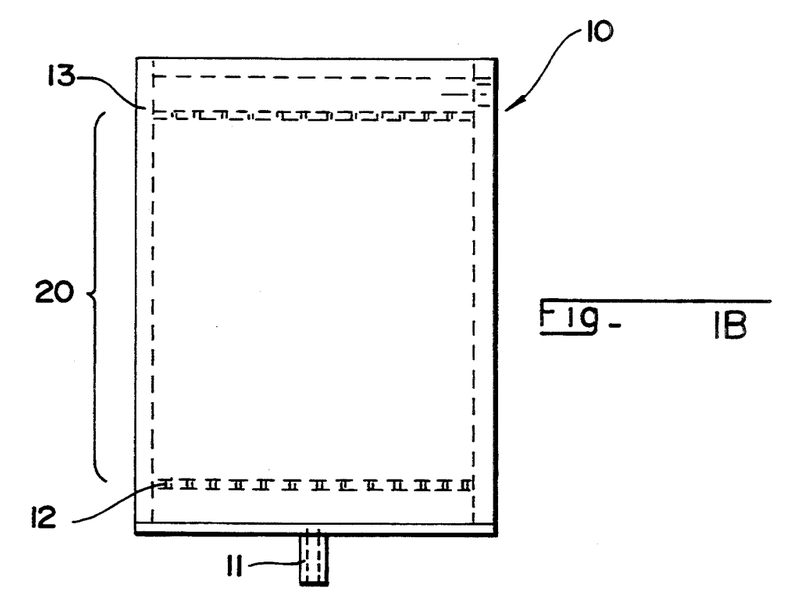

Now referring to the drawings. In FIGS. 1A and 1B, it is shown a side view and a front view, respectively, of a rectangular box type reactor vessel 10 packed with catalysts in its catalyst region 20. The dimensions of the box-type reactor are 24" (height)×12" (width, or first width)×2" (depth, or second width). The reactor is packed with an appropriate catalyst to carry out desired chemical reaction. Reactants enter the reactor via an inlet 11. A perforated plate 12 is placed between the inlet 11 and the catalyst region 20 to provide support and facilitate uniform distribution of reactants into the catalyst region 20. A similar perforated plate 13 is also provided between the catalyst region 20 and the outlet 14, to further improve the distribution of reactants in the catalyst region 20.

Figure 2A:
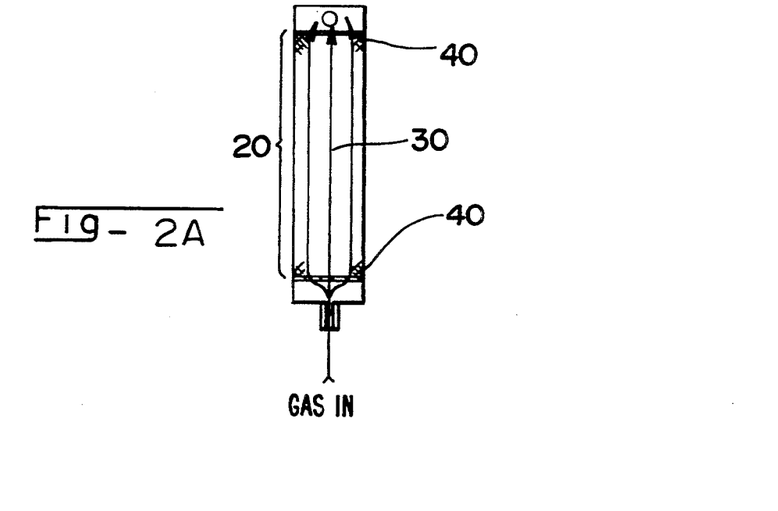
FIGS. 2A and 2B are a side View and a front view, respectively, of a typical flow pattern inside a rectangular tank-type fixed-bed reactor without the partitioning plates.
Figure 2B:
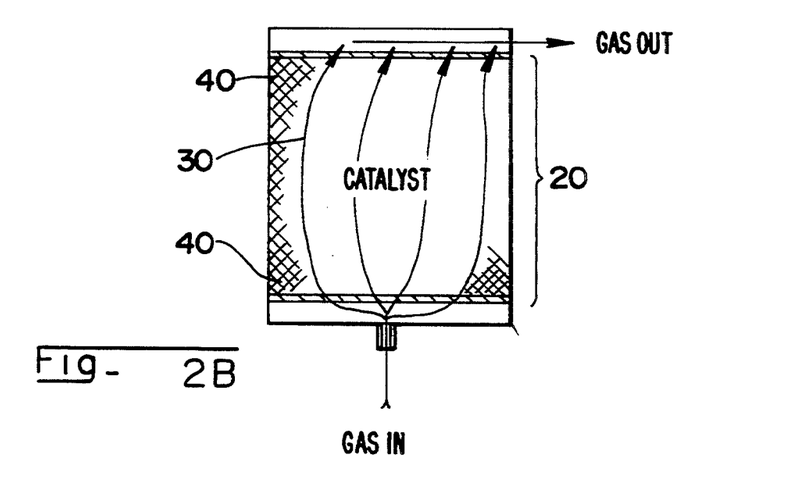

FIGS. 2A and 2B show the side view and front view, respectively, of a typical gas flow pattern across the catalyst region 20. The gas flow path 30 is limited to the length of the catalyst region 20. As indicated in FIGS. 2A and 2B, because of the relatively low ratio between the length of the flow path and its cross-sectional area, a significant portion of the catalyst region 20 becomes "dead spots" 40 wherein poor or zero gas flow exists, thus creating regions of inhomogeneity inside the reactor. Furthermore, because of the need to provide the required resident time in order for the gas reactants to achieve a desired conversion rate, a relatively low gas flow rate, and consequently a relatively low pressure, must be maintained in the reactor. This further amplifies the inhomogeneity problem of the box type reactor shown in FIGS 1A and 1B. Inhomogeneity in the fixed bed causes inefficient use of the catalyst and shortens the life thereof; it could also result in undesired by-products.

Figure 3A:
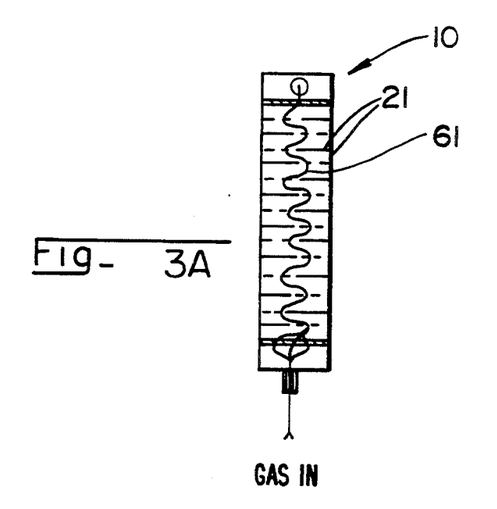
FIG. 3A is a side view of a typical flow pattern inside a rectangular tank-type fixed-bed reactor with baffles.

FIG. 3A shows that the flow path in the box type reactor may be increased by inserting a plurality of conventional baffles 21 along the flow path in the reactor vessel 10. Some improvements were observed with the implementation of the baffles 21 relative to the reactor shown in FIGS. 2A and 2B. However, the existence of the baffles 21 created many separate commingling flow paths of the reactants and a substantial extent of undesired mixing between product streams and reactant streams. Furthermore the increase in reaction path is limited and the flow paths 61 created as a result of the baffles 21 are not always stable; rather, they are often subject to the pressure drop across the reactor and the flow rate of the gas reactants. Some dead spots still exist, and the reactants travel through the catalyst region with a wide range of resident times.

Figure 3B:
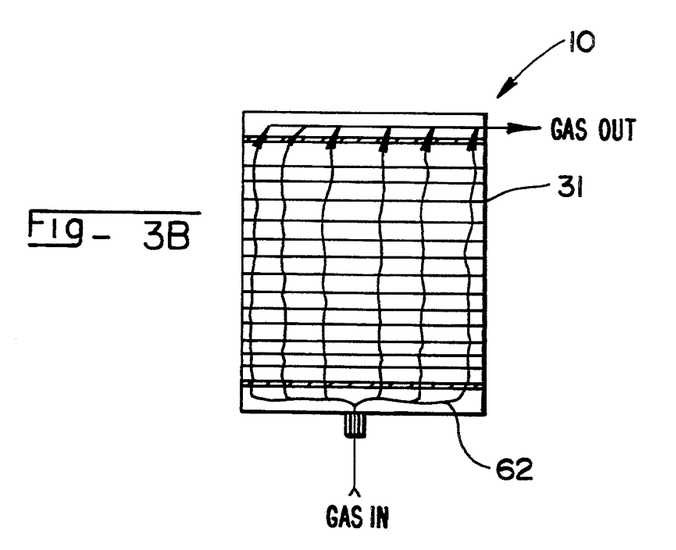
FIG. 3B is a front view of a typical flow pattern inside a rectangular tank-type fixed-bed reactor with slot liner plates.

FIG. 3B shows another embodiment which uses slotted liner plates 31, instead of the baffles 21 as shown in FIG. 3A, to improve the flow characteristic in the tank reactor. A slotted liner is a thin plate containing very small perforations therethrough. The distance between adjacent slotted liner plate was about one inch. The slotted liner increased the pressure drop across the reactor and improved the distribution of gas reactants in the tank reactor. However, substantial back-mixing was experienced and the reactor deviated substantially from the desired plug flow type reaction. The flows paths 62 provided in the reactor also cross each other, and are subject to change due to changes in pressure drop across the reactor and the flow rate of the gas reactants.

As discussed above, although the baffles 21 and slotted liners 31 improved the reaction performance in the tank type reactor 10, they did not provide the desired plug flow type characteristic desired from tubular type reactors, and only a limited extent of increase in the reaction path could be obtained. Another major shortcoming associated with either the baffled or slotted liner reactor as the substantial mixing of the reactant and product streams. In catalytic reactions involving gaseous reactants, it is highly desirable to eliminate commingling of product stream with reactant stream to minimize the production of by-products.

Figure 4:
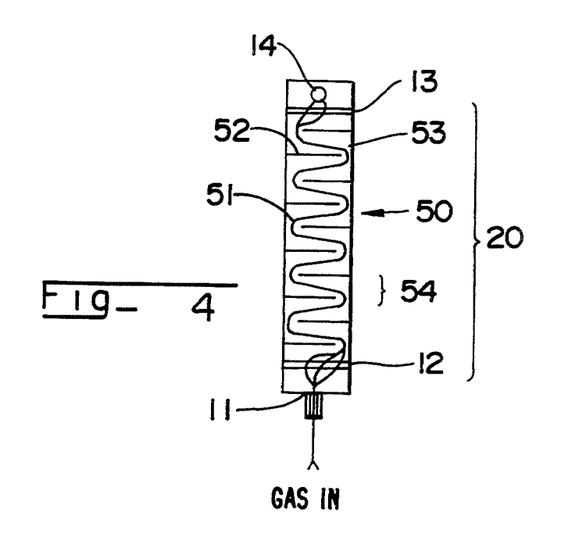
FIG. 4 is a side view showing a typical flow pattern inside the fixed-bed reactor of the present invention containing staggered partitioned plates.

A schematic diagram of an example of the folded path fixed bed reactor disclosed in the present invention is shown in FIG. 4. The folded path reactor 50 comprises a reactor vessel 10 which has a external dimension of $24'' \times 12'' \times 2''$, identical to that shown in FIGS. 1A and 1B. Perforated plates 12 and 13 are fixedly placed near the gas inlet 11 and gas outlet 14, respectively, in the reactor vessel 10 to improve distribution of gaseous reactants and products therethrough. The folded path 51 in the reactor vessel 10 is created with the use of a plurality of substantially rectangular partitioning plates 52 arranged in a staggered manner as shown in FIG. 4. These partitioning plates 52 provide staggered openings 53 adjacent to alternating sides of the internal walls of the reactor vessel 10 as shown in FIG. 4. Each partitioning plate has a dimension by which one side thereof is essentially identical to a corresponding side of the reactor vessel 10 to allow the partitioning plate 52 to be firmly affixed to the inside of the reactor by a frictional force. Whereas the other side of the plate is shorter than the corresponding side of the inner wall of the reactor vessel by a predetermined length so as to form the openings 53 allowing the gaseous reactants and products to move through. It is desirable that the width of the opening is in the same order of magnitude as the spacing 54 between two partitioning plates 52.

One of the advantages of the present invention is that a tight packing can be achieved even with the presence of the partitioning plates 52, thus minimizing the occurrence of channeling, while providing the folded reaction path to increase the flow length for the reactant gas. In making a preferred embodiment of the folded reaction path reactor of the present invention, the catalyst was first loaded into the reactor vessel, without any partitioning plate, in the catalyst region 20 above the lower perforated plate 12. After the catalyst filled a pre-determined thickness, which corresponded to the designed spacing between the first pair of partitioning plates in one instance the preferred thickness was about 1.6 inches, a thin aluminum partitioning plate having a dimension of $11\frac{7}{8}'' \times 1\frac{1}{2}''$ was placed on top of the catalyst packing. The length of the partitioning plate 52 is almost the same but only slightly smaller than the internal width of the longer side of the reactor vessel 10 to allow the plate to be tightly but removably affixed to the reactor walls by a frictional force therebetween. The partitioning plate 52 was then inserted inside the reactor vessel such that one side thereof tightly adjoined to the side wall of the reactor, while the other side provided a half-inch opening for the gas stream to make a turn. Since the partitioning plate can be slightly bent or tilted inside the reactor vessel, the length of the partitioning plate can be slightly greater than the corresponding width of the reactor vessel to increase the frictional support.

In the above described embodiment of the present invention, the plates are held in place by the frictional force between the two edges of the plate and the inner wall of the reactor. Since most catalysts have only a limited life, it is, therefore, desirable, to have partitioning plates that are removable, as disclosed in the preferred embodiment described above. However, if necessity dictates, the present invention does not exclude the options of using permanent means, such as Welding, epoxying, screwing, etc, to securely affix the plates to the reactor. Alternatively, t;he inner wall of the reactor vessel can be provided with a plurality of grooves to allow the partitioning plates to be securely snapped thereto.

Figures 5A, 5B:
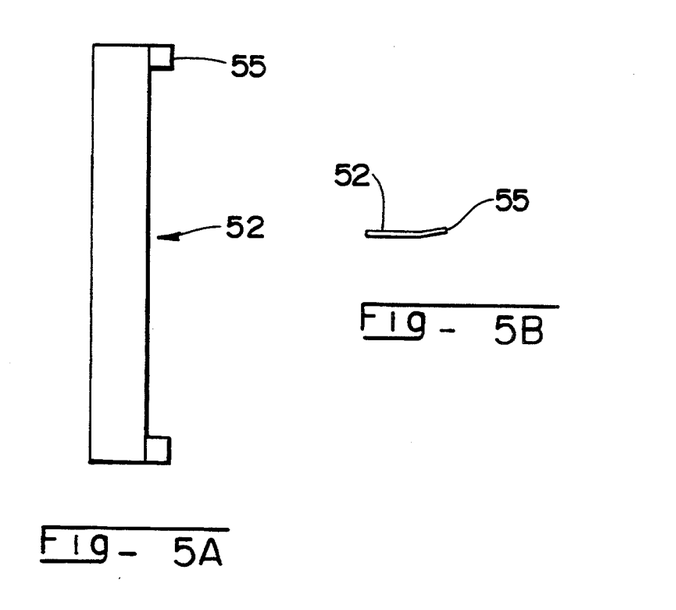
FIGS. 5A and 5B are a side View and a front view, respectively, of a rectangular partitioning plate having two finger at both ends.
Figure 6:
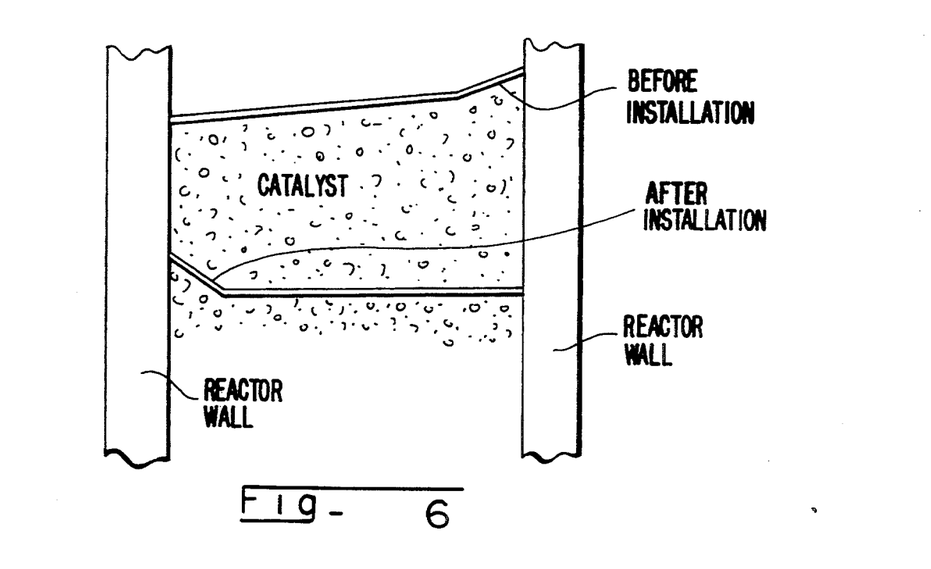
FIG. 6 is a side view of a portion of the fixed-bed reactor of the present invention containing fingered partitioning plates.

Another approach to improve the frictional contact between the plates and the reactor is to use a "finger" design, as shown in FIGS. 5A (top view) and 5B (side view). A finger 55 is a relatively slender piece extending from the non-adjoining side of the partitioning plate so that the overall width of the plate is the same or slightly greater than the width of the corresponding inner side of the reactor vessel. The fingers 55 are designed so that they can be slightly bent (FIG. 6) to allow the partitioning plates 52 to be inserted into the reactor. One of the main purposes of using the fingers 55 is to increase the frictional contact between the partitioning plates 52 and the reactor vessel 10, thus improving the stability of the partitioning plates 52 inside the reactor. Another main purpose of the fingers 55 is to serve the function as a spacer to prevent any horizontal movement of the partitioning plates 55 and thus ensuring a stable folded path for reaction streams inside the reactor. Although the fingers 55 can be placed anywhere along the side of the plate, it is desirable that they be located at the two ends of the non-adjoining side of the partitioning plates 52 and flush with the edges, respectively, of the partitioning plates 52, as shown in FIGS. 5A and 5B By being at the end of the partitioning plate 52 and flush with the edges thereof, the fingers 55 provide additional frictional support for securing the partitioning plates 52 in place.

A fixed bed reactor as described in FIGS. 1A and 1B was constructed. A reactant stream containing oxygen, propylene, air, as shown in Table 1, was introduced into the reactor vessel 10 via the inlet 11 at a rate of 20 liters per minute. The reactor temperature was maintained at about 410°-415° C. The product stream was collected and analyzed using gas chromatography. Then results are shown in Table 1. In a separate unit, the reactor was modified by inserting partitioning plates in the procedure described above to form a fixed bed reactor containing folded reaction path. An identical reactant stream was introduced into the second reactor under identical reaction conditions. The product stream was collected and also analyzed using gas chromatography. Then results are also shown in Table 1. From Table 1, it can be seen that, with the folded path of the present invention, the yield of acrolein (defined as amount of acrolein out/amount of propylene in) was increased from 38% to 55%, and the reaction conversion (defined as the amount of propylene out/amount of propylene in) was increased from 42% to 61%. This represented an improvement of about 50% with the same quantity of catalyst, contained in the same volume and held in an enclosure of the same overall shape and dimension.

TABLE 1

| Component | Without Folded Path | With Folded Path |
| --- | --- | --- |
| Input Stream: | | |
| Oxygen | 18% | 18% |
| Pxopylene | 13% | 13% |
| Nitrogen (Air) | 69% | 69% |
| Carbon Dioxide | trace | trace |
| Water | trace | trace |
| Output Stream: | | |
| Oxygen | 12.4% | 7.4% |
| Propylene | 7.6% | 5.1% |
| Nitrogen (Air) | 69% | 69% |
| Carbon Dioxide | 0.5% | 2.1% |

TABLE 1-continued

| Component | Without Folded Path | With Folded Path |
| --- | --- | --- |
| Water | 5.4% | 9.2% |
| Acrolein (desired product) | 4.9% | 7.1% |

The locations of the partitioning plates 52, as well as the number thereof, can be conveniently adjusted according to the need and the type of reaction encountered. Furthermore, although the vertical cross-sectional area of the folded-path 51 is constant across, each spacing between two adjacent partitioning plates 52, it can be varied vertically by adjusting the spacing between the partitioning plates 52. For example, in some reactions, it may be desirable to have the partitioning plates 52 separated at a greater distance near the inlet 11 of the reactor vessel 10 than near the outlet 14 to allow for a lower linear velocity and a longer resident time during the initial stage of the reaction. This order may be reversed in other types of reactions. The present invention provides a great flexibility for the design of reaction path and locally adjustable resident times to obtain an optimum reaction condition inside the reactor vessel.

The folded path reactor disclosed in the above described embodiment may be modified to substantially increase the reaction path length/reactor length ratio. In the embodiment described in FIG. 4, the reactants travelled along the shorter edge of the partitioning plate 52 and perpendicular to the longer edge. In an alternate embodiment, the plates can be made such that it short side matches the short side of the reactor but its long side is shorter than the long side of the reactor vessel. With the alternate embodiment, the reactants travel along the longer edge of the partitioning plate 52 and perpendicular to the shorter edge, thus resulting in a substantially increased reaction path length relative to reactor length.

Figure 7:
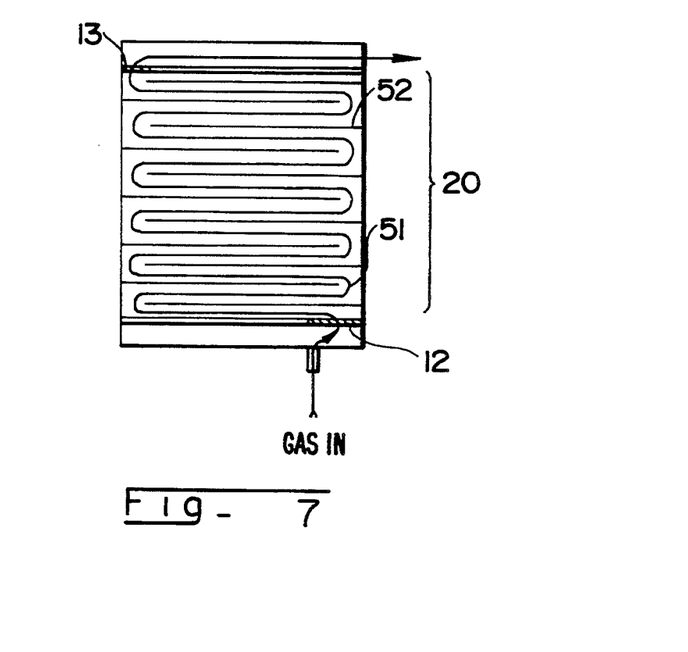
FIG. 7 is a side view of an alternative embodiment of the present invention in which the gas reactants travel along the long side of the reactor vessel thus creating an extremely long reaction path.

To further ensure that all the reactants have a uniform reaction path length, the perforated plates 12, 13 can be replaced with support plates that are perforated only at one end thereof, as shown in FIG. 7, so as is create a folded path even at the entrance and outlet portions of the catalyst region 20. The perforated portion of supporting perforated plates 12, 13 is disposed opposite the opening formed at the first and the last partitioning plate, respectively.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A fixed bed reactor comprising:
   (a) a substantially rectangular reactor vessel having an inlet, an outlet, an internal wall, and first and second inner widths; and (b) a plurality of spaced apart partitioning plates inside said reactor vessel, said partitioning plates being spaced apart in a staggered manner so as to create a plurality of staggered openings between said partitioning plates and said reactor vessel and this a folded path for reactants traveling through said reactor.

2. The fixed bed reactor of claim 1 further comprises a catalyst region which is packed with catalyst and defined by a pair of perforated supporting plates near said inlet and outlet, respectively, of said reactor vessel.

3. The fixed bed reactor of claim 2 wherein said perforated supporting plates are perforated only at one end which is opposite to an opening formed between said vessel wall and a partitioning plate immediately adjacent said supporting plate.

4. The fixed bed reactor of claim 1 wherein said partitioning plates are fixedly but movably attached to said reactor vessel by a frictional force therebetween.

5. The fixed bed reactor of claim 1 wherein each of said partitioning plates is substantially rectangular in shape and has first and second sides, said first side of said partitioning plate plate having substantially the same length as said first inner width of said reactor vessel, and said second side of said partitioning plate being shorter than said second inner width of said reactor vessel.

6. The fixed bed reactor of claim 5 wherein each of said partitioning plates contains at least one finger extending from said first side thereof, said finger is bendable and has a dimension such that the aggregate length of said second side and said finger is substantially the same or slightly greater than that of said second inner width of said reactor vessel so as to provide an additional affixing means to secure said partitioning plates inside said reactor vessel and prevent horizontal movement of said partitioning plates.

7. The fixed bed reactor of claim 5 wherein said first inner width is substantially longer than said second inner width.

8. The fixed bed reactor of claim 5 wherein said second inner width is substantially longer than said first inner width.

9. The fixed bed reactor of claim 1 wherein said partitioning plates are spaced apart at equal spacing.

10. The fixed bed reactor of claim 1 wherein said partitioning plates are spaced apart at a greater spacing near said inlet of said reactor vessel and at a shorter spacing near said outlet of said reactor vessel.

11. The fixed bed reactor of claim 1, wherein said partitioning plates are spaced apart at a shorter spacing near said inlet of said reactor vessel and at a greater spacing near said outlet of said reactor vessel.

12. The fixed bed reactor of claim 1 wherein said partitioning plates are spaced apart at a spacing which is shorter than either said first width or said second width of said reactor vessel.

13. The fixed bed reactor of claim 1 wherein at least one half of said partitioning plates are spaced apart at a spacing which is shorter than either said first width or said second width of said reactor vessel. plate and a partitioning plate immediately adjacent thereto.

14. The fixed bed reactor of claim 1 which comprises at least three of said staggered partitioning plates.

15. The fixed bed reactor of claim 1 wherein said internal wall of said reactor vessel contains a plurality of grooves at appropriate locations allowing said partitioning plates to be snapped therein.

* * * * *